United States Patent
Oh et al.

(10) Patent No.: US 9,805,490 B2
(45) Date of Patent: *Oct. 31, 2017

(54) METHOD FOR SCRIPTING INTER-SCENE TRANSITIONS

(71) Applicant: EveryScape, Inc., Newton, MA (US)

(72) Inventors: Byong Mok Oh, Palo Alto, CA (US); James Schoonmaker, Arlington, MA (US); Sidney Chang, Waterloo (CA)

(73) Assignee: EveryScape, Inc., Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,620

(22) Filed: Nov. 16, 2015

(65) Prior Publication Data

US 2016/0071301 A1 Mar. 10, 2016

Related U.S. Application Data

(63) Continuation of application No. 11/936,990, filed on Nov. 8, 2007, now Pat. No. 9,196,072.

(Continued)

(51) Int. Cl.
*G06T 13/00* (2011.01)
*G06T 13/20* (2011.01)
(Continued)

(52) U.S. Cl.
CPC ............. *G06T 13/20* (2013.01); *G06T 13/40* (2013.01); *G06T 13/80* (2013.01); *G06T 15/04* (2013.01);
(Continued)

(58) Field of Classification Search
CPC ......... G06T 13/40; G06T 13/00; G06T 13/80; G06T 13/20; A63F 13/10
See application file for complete search history.

(56) References Cited

U.S. PATENT DOCUMENTS

| | | | | |
|---|---|---|---|---|
| 6,600,491 B1* | 7/2003 | Szeliski | ................ | G06T 13/80 345/421 |
| 6,611,268 B1* | 8/2003 | Szeliski | ................ | G06T 13/80 345/420 |
| 6,636,220 B1* | 10/2003 | Szeliski | ................ | G06T 13/80 345/475 |

OTHER PUBLICATIONS

Snavely et al., "Photo Tourism: Exploring Photo Collections in 3D," ACM Transactions on Graphics—Proceedings of ACM SIGGRAPH 2006, vol. 25, No. 3, 12 pages, Jul. 2006.

(Continued)

*Primary Examiner* — Abderrahim Merouan
(74) *Attorney, Agent, or Firm* — Sunstein Kann Murphy & Timbers LLP

(57) ABSTRACT

A method for authoring and displaying a virtual tour of a three-dimensional space which employs transitional effects simulating motion. An authoring tool is provided for interactively defining a series of locations in the space for which two-dimensional images, e.g., panoramas, photographs, etc., are available. A user identifies one or more view directions for a first-person perspective viewer for each location. For pairs of locations in the series, transitional effects are identified to simulate smooth motion between the pair of locations. The authoring tool stores data corresponding to the locations, view directions and transitional effects for playback on a display. When the stored data is accessed, a virtual tour of the space is created that includes transitional effects simulating motion between locations. The virtual tour created can allow a viewer to experience the three-dimensional space in a realistic manner.

16 Claims, 9 Drawing Sheets

Related U.S. Application Data

(60) Provisional application No. 60/858,511, filed on Nov. 13, 2006.

(51) Int. Cl.
*G06T 13/80* (2011.01)
*G06T 13/40* (2011.01)
*G06T 15/04* (2011.01)
*G06T 15/20* (2011.01)
*G06T 19/00* (2011.01)
*G06T 19/20* (2011.01)
*A63F 13/40* (2014.01)

(52) U.S. Cl.
CPC .......... *G06T 15/205* (2013.01); *G06T 19/006* (2013.01); *G06T 19/20* (2013.01); *A63F 13/10* (2013.01); *G06T 13/00* (2013.01); *G06T 2200/04* (2013.01); *G06T 2215/16* (2013.01); *G06T 2219/004* (2013.01); *G06T 2219/016* (2013.01)

(56) References Cited

OTHER PUBLICATIONS

European Patent Office, Examination Report—Application No. 07868697.9-1906 dated Sep. 27, 2013, 6 pages.
Christopher Gibbs Haseltine Lake LLP, Response to Examination Report dated Sep. 27, 2013 for Application No. 07868697.9-1906, filed on Apr. 2, 2014, 11 pages.

\* cited by examiner

Experience Details

Title: South Beach Walk

Description: This is my first Experience of wal

Introduction: South Beach walk on my Vacatio

Add    Effect    Edit    Delete

South Beach
2091
/usa/florida/miami_beach/south_beach
phi. 130.theta: 0

Lummus Park
4003
/usa/florida/miami_beach/south_beach

Lummus Park
4064
/usa/florida/miami_beach/south_beach

Ocean Drive and 14th Street
3009
/usa/florida/miami_beach/south_beach
phi. 212.355. theta: 20.311

Ocean Drive
3010
/usa/florida/miami_beach/south_beach

Preview

FIG. 9

METHOD FOR SCRIPTING INTER-SCENE TRANSITIONS

RELATED U.S. APPLICATIONS

The present U.S. Patent Application is a continuation application of U.S. application Ser. No. 11/936,990 filed on Nov. 8, 2007, entitled "Method for Scripting Inter-Scene Transitions," which itself claims priority from U.S. Provisional Patent Application Ser. No. 60/858,511, filed on Nov. 13, 2006, entitled "Method for Scripting Inter-Scene Transitions," all of which are incorporated herein by reference in their entirety.

TECHNICAL FIELD

The invention relates to computer graphics, and in particular, to methods and systems for scripting movement between two or more related images or panoramas.

BACKGROUND

Virtual tours have become a frequently used technique for providing viewers with information about three-dimensional spaces of interest. Such tours can provide a photorealistic, interactive and immersive experience of a scene or collection of scenes. These tours can incorporate one or more of a wide variety of graphic display techniques in representing the scenes.

However, current virtual tour implementations employing images and panoramas have significant limitations. The inherent nature of panoramas (including regular photographs and images) is that panoramas are taken from a single acquisition position, and, thus, the images are static. To describe a broader area, i.e., beyond a view from a point in space, panoramic virtual tours typically employ a "periscope view"—the end user "pops" into a point in space, looks around, and then instantaneously "pops" into another position in space to navigate through a wider area. Assuming a simple case of two panoramic scenes, even when the acquisition positions are very close, it is often difficult for the viewer to mentally connect the two scenes. The two panoramas are not inherently capable of describing how the panoramas are connected and oriented with respect to each other. With these limitations, it is difficult for the viewer to understand the space, sense of orientation, and scale of a wider area with current virtual tours. Additional techniques are required to allow virtual tours to more readily facilitate viewer understanding of three-dimensional spaces.

SUMMARY OF THE INVENTION

In embodiments of the invention, a method is provided for authoring a motion picture experience of a three-dimensional space based on a series of digitally stored 2-D images of the space. Using a map view of the space, a user defines a series of locations using graphical inputs. For each location in the series of locations, the user then employs a first person view of the space linked to the map view to define directions for perspective views of the space at that location. For pairs of locations in the space, the user graphically describes transitional effects that will be employed when the experience transitions between locations, simulating motion. Data corresponding to user selections is stored for later playback of the motion picture experience on a display.

In other embodiments of the invention, a method is provided for displaying a motion picture of a three-dimensional space based on a series of digitally stored 2-D images of the space. Stored data is accessed that includes 2-D images for a series of locations in the space, view directions for each location and transitional effect information for pairs of locations. The data is used to generate a motion picture experience of the space. The motion picture experience is then displayed on a display. The experience is based on the accessed data using transitional effect information to provide transitions between pair of locations in the series of locations, such that there is simulated motion between the locations.

BRIEF DESCRIPTION OF THE DRAWINGS

The foregoing features of the invention will be more readily understood by reference to the following detailed description taken with the accompanying drawings:

FIG. 9 illustrates adding panoramas to an experience using the experience details text box of the authoring tool, in an embodiment of the invention;

DETAILED DESCRIPTION OF EMBODIMENTS OF THE INVENTION

Figure 1:
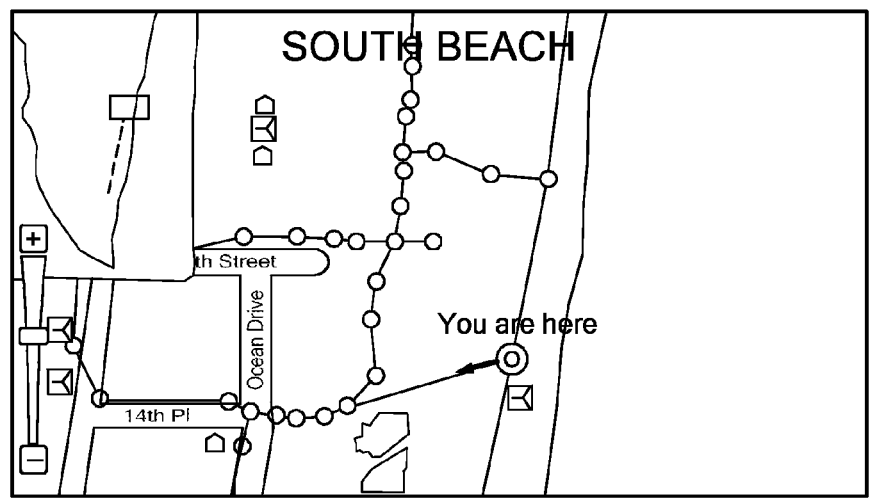
FIG. 1 is a display screen showing a map viewer, according to an embodiment of the invention.

A method and system for providing a virtual tour is described in U.S. patent application Ser. No. 11/271,159, entitled "Method for Inter-Scene Transitions," filed Nov. 11, 2005, which is incorporated herein by reference in its entirety. The text and figures of this application are also appended to this description as Appendix 1 and form part of the detailed description of this specification. Terms used in Appendix 1, unless context requires otherwise, shall have the same meaning throughout this specification.

In broad overview, embodiments of the invention described in Appendix 1 provide a system and a method that simulates smooth motion between images of two or more connected locations or scenes in a virtual tour of a space. Simulated motion provides a sense of orientation and an understanding of the space to users navigating through images of the space. To navigate from one image to another, a user may select a portion of a first scene that connects to a second scene. The view is then transitioned to the second scene. This type of navigation may be disorienting if the second scene simply replaces the first scene—there is no sense of motion between the scenes to emphasize the geographic connection between them. Instead, smooth and continuous motion between the two scenes may be simulated to provide the viewer a better sense of the relationships between the two scenes, including a sense of space and orientation. Such smooth and continuous motion can be simulated by transitional effects between pairs of locations. Such transitional effects include, but are not limited to: blending, morphing, fade-in-fade-out, etc. The techniques for simulating smooth motion between locations, many of which are described in Appendix 1, will be called hereafter collectively "transitional effects" and the data that describes one or more of these effects will be called "transitional effect data" or "transitional effect information."

In further embodiments of the invention described in Appendix 1, this concept of simulating motion between images can be extended to create a network of multiple images forming a tour of a space, such as a neighborhood, a boulevard, or even a town or city. Such a network of scenes will be called below a "supertour." The term "supertour" is used for convenience in description and not by way of limitation: the network of images may extend from two images to an arbitrarily large number of images. While the supertour space may be physically continuous, the space may also be discontinuous and may even contain portions that are imaginary. Methods for creating a supertour are described in Appendix 1.

In broad overview, embodiments of the present invention provide a method and a system for selecting a subset of a supertour, storing that subset for later recall and sharing the subset with other viewers. The viewer can display the subset of the supertour on a display surface. This stored subset will be called in this specification, unless context requires otherwise, a "motion picture experience." The term "motion picture experience" means the same as "experience", emphasizing the movie-like effect that can be achieved with playback of the experience. While an experience is described as a subset of a supertour, the supertour itself can combine portions of various spaces, real and/or imaginary. An experience, for example, can include a subset of a combination of individual supertours. Further, an experience may include annotations for the display, such as text and audio, and may include directives (i.e., a script) to lead the viewer in a preferred sequence through the subset of the supertour. For example, at a given location, a series of view directions may be scripted so that a viewer sees specific views from the location using a perspective image viewer. While a supertour generally includes an expansive connected network of locations, an experience may also focus on a single location. In that location, the experience can include a series of view directions together with annotations. In embodiments of the present invention, a supertour network represents a three-dimensional space—a space that we are all familiar with. Note that as used in this description and the accompanying claims, unless the context otherwise requires, a "realm" will mean a three-dimensional space. Note that the parts of a realm need not be contiguous—realms may include discontinuities. While a realm may represent an actual physical space, any part of a realm may be imaginary.

In FIG. 1, in an embodiment of the invention, dots 10, 11 on a map represent nodes which are locations in a three dimensional space or realm in a supertour. The dots are joined by links 20 which represent a relationship between the nodes. More specifically, the dots represent a location where 2-D images, such as photographs or panoramic images or other 2-D renderings are available. The links represent inter-scene transitions, as described in Appendix 1, that has been created so that a user can interactively navigate the space using a map viewer (e.g., FIG. 1) and a first-person viewer (e.g., FIG. 2), with simulated continuity between locations. Note that as used in this specification and in the claims, a "map viewer" or "map view" means a top-down, 2-D view of a realm. A map view may include a "gods-eye" photographic image of the realm, or a synthetic image or a vector representation of the realm with appropriate annotations or a hybrid of these types of representations. A "first person viewer" or "first person view" is a perspective view of the space as seen from a location.

The map viewer interactively displays map-related data. The map viewer may be embedded in a web browser and interactively driven by the user. Similarly, the first-person viewer is an interactive viewer that represents what a user sees at the current position on the map. Typically, this view is a perspective view of the space as seen from the current position. In an embodiment of the invention, the first-person viewer is an interactive viewer that displays a full panoramic image that covers a 360-degree by 180-degree field of view. The map viewer and the first-person viewer can communicate with each other to ensure that the viewers remain synchronized.

Figure 2:
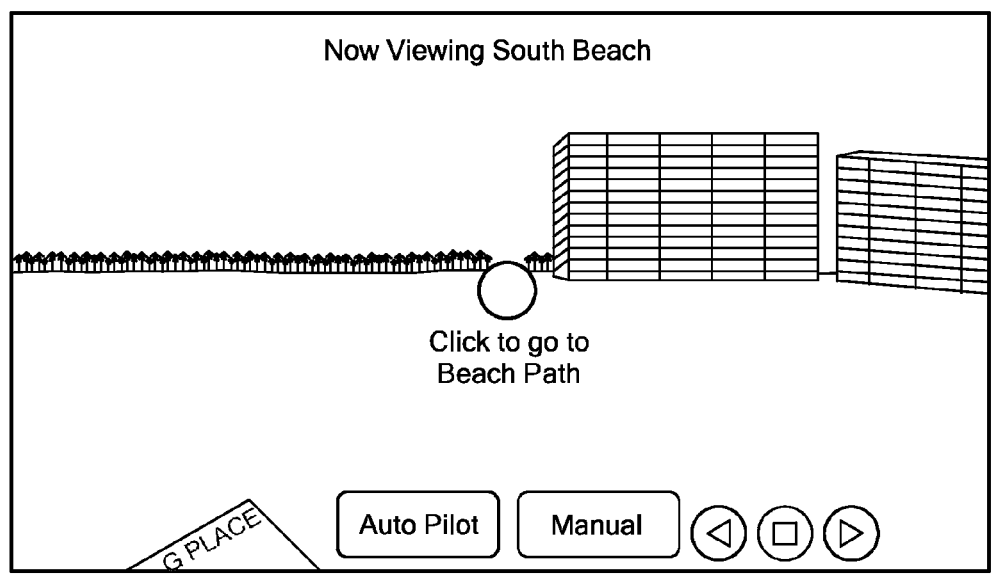
FIG. 2 is a display screen showing a first person viewer, according to the embodiment of FIG. 1.

In the first-person viewer, various types of contextual hyperlinks may be embedded in the view. In FIG. 2, the dot with the text description "Click to go to Beach Path" is an example of a contextual hyperlink. Clicking on the dot will invoke a transition command that smoothly and three-dimensionally moves the view from the current position to the connected "Beach Path" position. Once the dot is clicked, the map viewer also responds accordingly moving the "You are here" arrow that signifies the current viewer position and map orientation to the position of the Beach Path. Of course, other hyperlinks may be embedded, as appropriate to the context.

As described above, an experience is a selected subset of a supertour network that may include additional annotations and directives indicating how to view the subset. Examples of an experience include network traversal from location A to B, changing view directions on the first-person viewer for a location, and hyperlinks that may be activated to provide annotations and other effects. There are also functional events, such as, "find the closest route from point A to point B," and "walk around randomly for the next 5 minutes" that may be initiated by user inputs.

Once data corresponding to this experience have been described or "recorded" with a scripting language, the experience may be played back and shared with others, such as over the internet or via a computer-readable medium. The script language that describes an experience may also incorporate additional text, images, videos, audio, etc. to further enhance the content. Storage of the data for the experience may be performed in various ways as are known in the art. For example, pointers to images, text, audio, etc. may be stored on a data set or the images, text, audio, itself may be stored on the data set or a mix of both techniques may be used. The data may be stored on any medium suitable for storing digital data. Once the data has been stored, a playback process is employed to access the stored data, combine the data with other stored data, and then to parse the data and generate audio and video for playback on a display surface.

Some classifications of experiences to note are: (1) linear vs. nonlinear and (2) deterministic vs. nondeterministic. We discuss these classifications to illustrate types of experiences.

Linear Vs. Nonlinear Experiences

Figure 3:
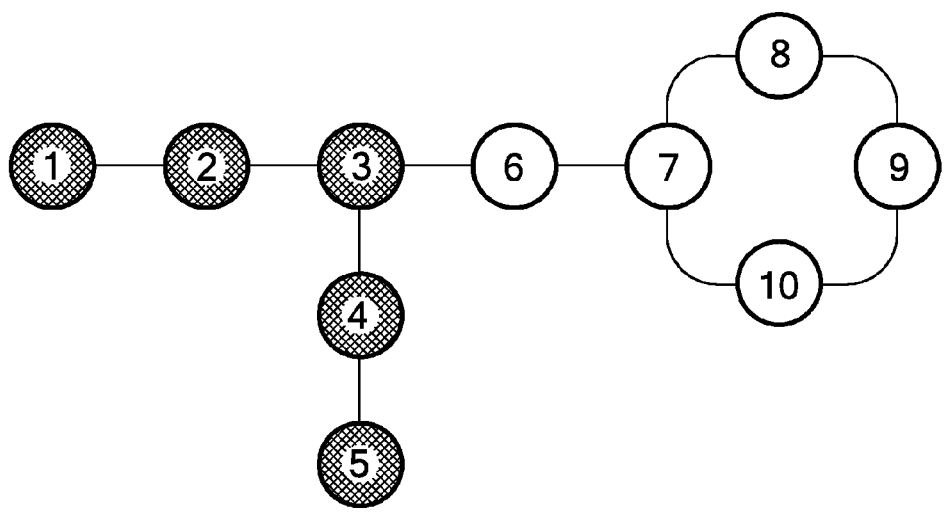
FIG. 3 illustrates a linear motion picture experience in an embodiment of the invention.

A linear experience is a sequence of connected nodes in the supertour network. As shown in FIG. 3, an exemplary linear experience sequence starts from node 1. The sequence then traverses nodes 2, 3, 4 and 5 in sequence. A node represents panoramic photography or other images for that location, and the edges represent bidirectional inter-scene transitions.

Figure 4:
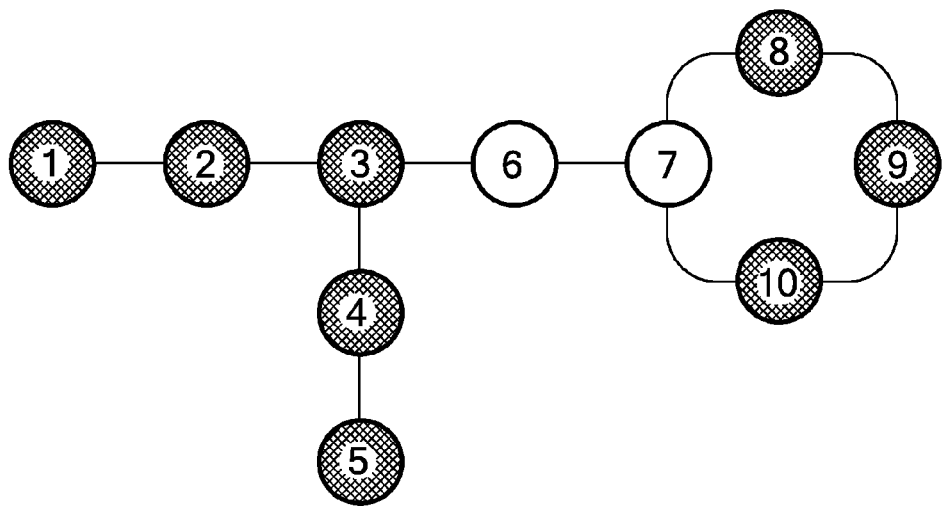
FIG. 4 illustrates a nonlinear motion picture experience with a discontinuous jump, according to an embodiment of the invention.

A nonlinear experience contains a sequence of nodes, some of which are discontinuous, not-connected nodes. FIG. 4 shows an example of a nonlinear sequence of nodes—1-2-3-4-5, then a discontinuous jump to node sequence 8-9-10. In such cases, the first-person viewer can playback the experience with a discontinuous transition effect, e.g., a blend between not-connected nodes.

Deterministic Vs. Nondeterministic Experiences

A deterministic experience is a fully predetermined sequence of information to be displayed—the experience will always produce the same path and effects during playback. A nondeterministic experience contains sequences which are not all predetermined. During playback (runtime) the resulting experience is not always the same.

Three types of nondeterministic experiences are random, points of interest, and branching experiences.

A random experience is when a playback starts from a random node and traverses the supertour network randomly. Various levels of randomness may be applied.

A points of interest ("POI") experience is an experience that is constrained such that the sequence must pass through user-specified nodes. For instance, given a beginning node and the ending node, find a path (if any) that satisfies certain constraints, such as finding shortest paths, scenic paths, or popular paths between two or more nodes.

A branching experience may be thought of as the converse of POI experiences. While POI experiences are constrained such that the traversal of the node sequence must include specified nodes, a branching experience must follow a deterministic path until the branching node is reached, at which point a user, an algorithm or some heuristics can determine a path to take, selected from two or more paths.

Components of an Experience

Figure 5:
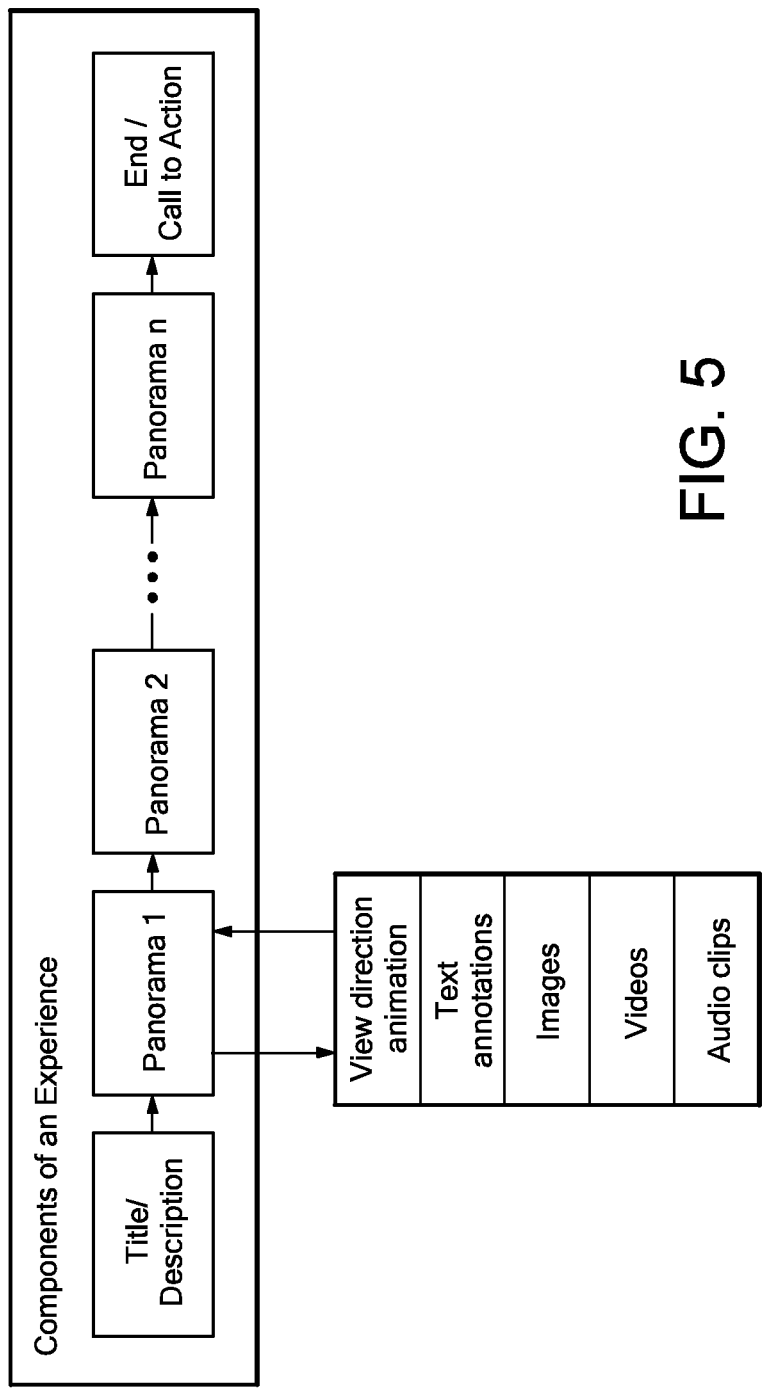
FIG. 5 shows an example of the components of an experience, according to an embodiment of the invention.

In embodiments of the invention, an experience typically consists of a beginning, a middle, and an end. As shown in FIG. 5, the title and description page is shown as the beginning, then a sequence of panoramas and inter-scene transitions as the middle (e.g. Panorama 1, . . . , Panorama n), and the call-to-action page as the end. The call-to-action page provides a list of options/actions at the end of an experience from which a user can choose, e.g. watch the experience again, watch the next experience if any, go to a related hyperlink, etc.

For each node in an experience, other parameters may be added to the images for the node, such as text and hypertext annotations, images, videos, audio, and view direction(s) (keyframe) animation, as shown in FIG. 5. Inter-scene transitions for linear sequences, other movie-like transitional effects (e.g. blending, morphing, fade-in-fade-out) for non-linear sequences and disconnected transitions link the nodes. Note that panoramas are described here as associated with nodes, but locations captured by non-panoramic images may be used as well.

Experience Authoring Tool

Figure 6:
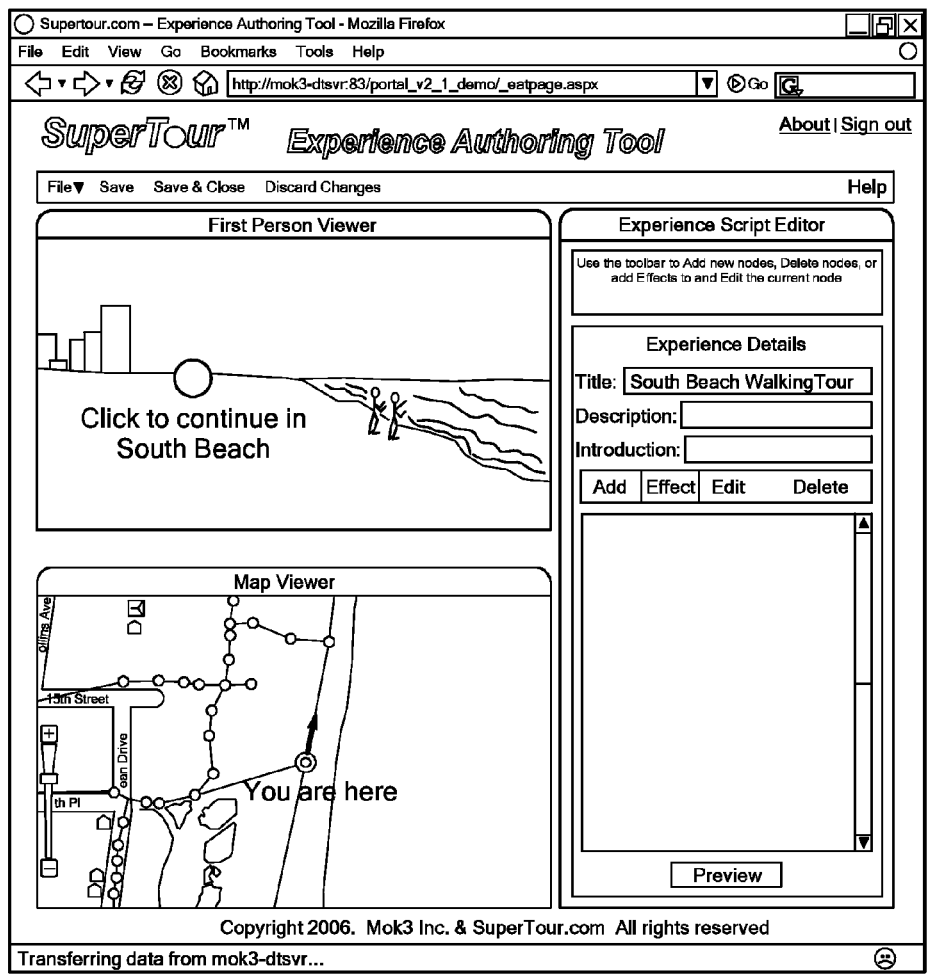
FIG. 6 is a display screen showing an authoring tool for an experience, in an embodiment of the invention.

In an embodiment of the invention, an experience authoring tool ("EAT") is an application for authoring the various types of motion picture experiences. EAT can run, for example, on a web browser, or other similar display. FIG. 6 shows a sample screen layout of EAT. As shown in this exemplary authoring tool, there are four top-level Graphic User Interface ("GUI") widgets: the menu bar on top, the first-person viewer, the map viewer, and the experience script editor.

The menu bar has basic features that allow users to open, create new, save, and close the authoring process. When EAT is run as a web application, the users can save their work locally on their computers, or even save their work on a secure server over the network.

The first-person viewer, in this embodiment of the invention, is an interactive panoramic viewer. Users can click-and-drag on the image to look all around 360 degrees, and fully up and down, 180 degrees. Note that a regular photograph/image player is a constrained panoramic viewer, where the viewer is constrained to the exact field of view of the image. The dots on the first-person viewer represent other nearby locations (nodes.) Clicking on a dot will smoothly, continuously, and in a three-dimensional manner, move the user to the location, as described in Appendix 1.

The map viewer is an interactive map where a user can click-and-drag to pan the map, zoom in and out, and interact with various objects on the map. In an embodiment of the invention, dots signify a position on the map, where panoramic photography or other images have been acquired. The lines that connect the dots signify links to other nearby panoramas. Of course, such links may be represented with other symbols.

Figure 7:
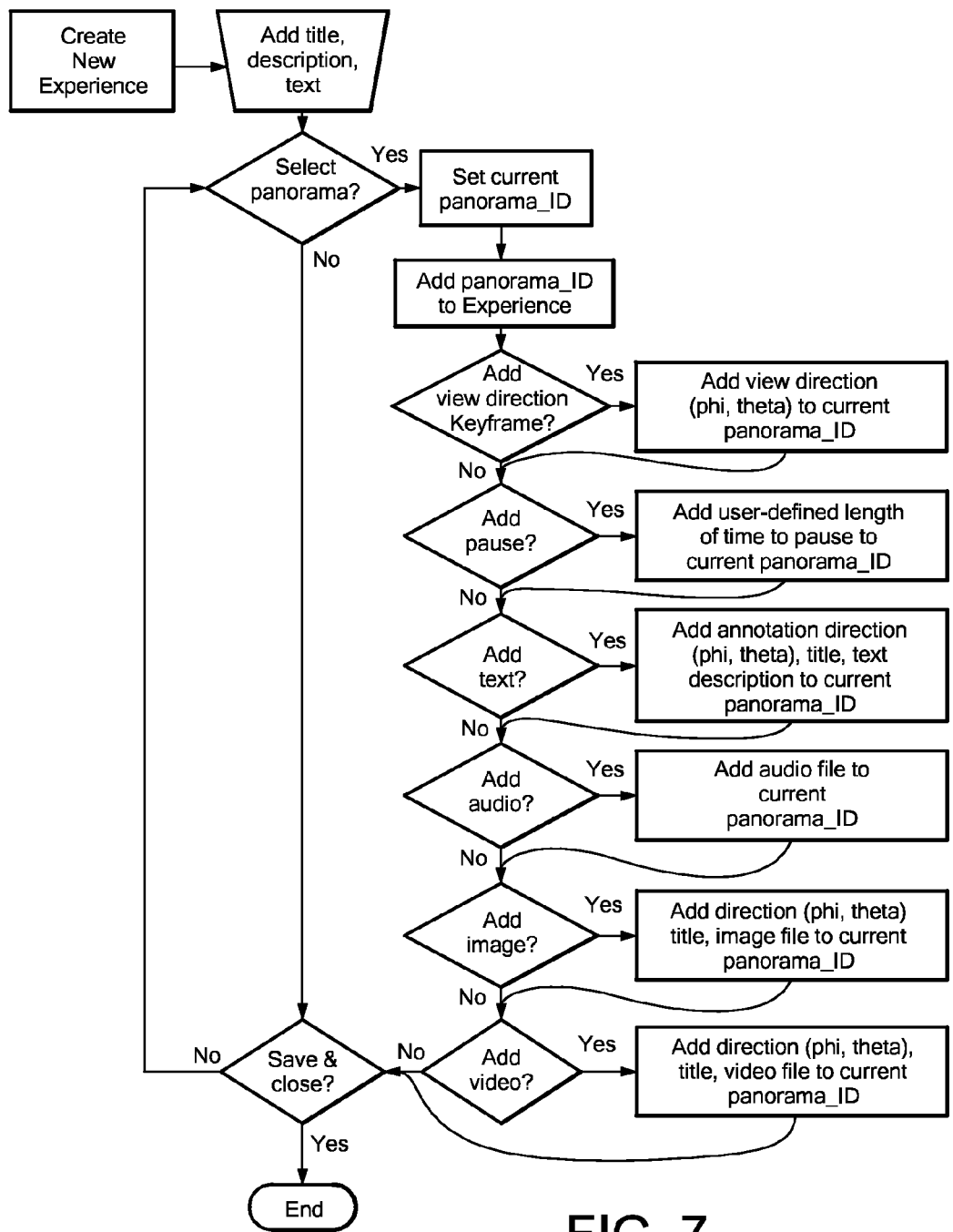
FIG. 7 is a flow diagram for authoring an experience according to an embodiment of the invention.

The experience script editor in the right column is the main control GUI feature for creating an experience. The user can add/delete specific panoramas/images, control view directions, add annotations, etc., to tell a story. An illustrative flow diagram for authoring an experience is shown in FIG. 7.

To start, the user selects "New experience" from the menu bar, and then fills out the Title, Description, and Introduction on the experience script editor widget in the right column.

Next, the user can add a sequence of panoramas by using the first-person viewer and the map viewer.

Figure 8:
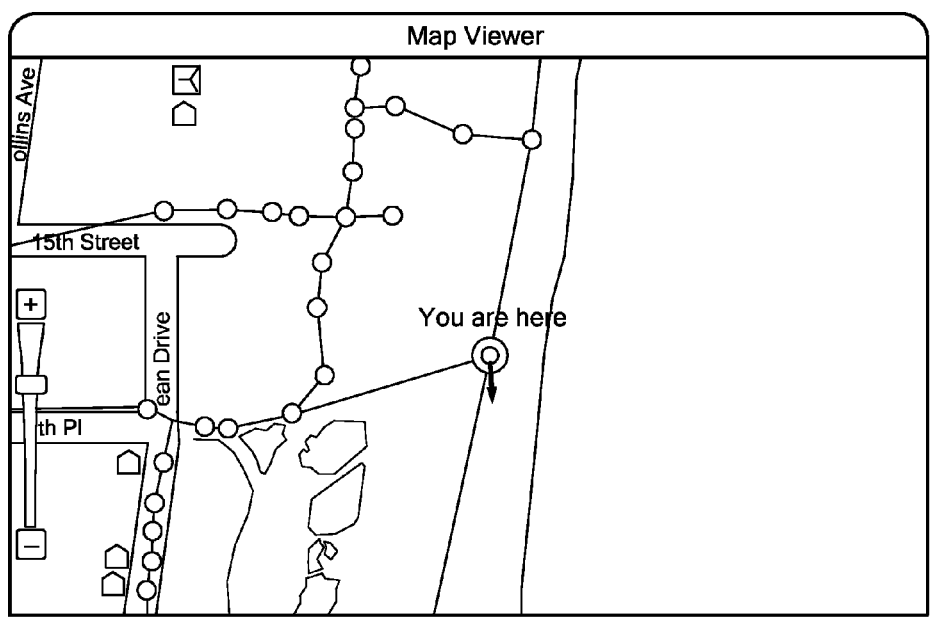
FIG. 8 illustrates a map view in a location to be added to the motion picture experience by the authoring tool, according to an embodiment of the invention.

From the supertour network, the user can add a specific location into the experience authoring process by selecting a dot (node) on the map. As shown in FIG. 8, in an embodiment of this invention, a dot signifies a specific place on the map (i.e., a node) in the map viewer, where panoramic (or other image) photography or other types of 2-D renderings are available, and the 2-D representation has been added to the supertour network. The words "You are here" and the arrow signify the current location and current view direction in the first-person viewer, respectively. (These design choices are exemplary and not by way of limitation).

Once the user selects a desired panorama, the panorama may be added to the experience sequence by selecting the "Add" button in the text box that is part of the authoring tool. As shown in FIG. 9, a series of panoramas has been selected and added to the sequence. Note that the series need not be a connected set of panoramas/images via supertour links. The series may be a nonlinear, disconnected sequence of panoramas as described above, and the user can select the desired transition effect. The user can either "jump" to a desired panorama or the user can select a desired inter-scene transition to a desired panorama, producing a continuous "moving-in-3D" effect. The user can also add a point of interest, or even a branching point, where a user chooses a specific path.

The user can further edit this sequence by selecting a node, such as with a pointing device. Once selected, dragging-and-dropping the node on the list enables the user to move and modify the sequence of panoramas. The user can also edit the viewing direction for each panorama. The parameters to be entered are angles phi and theta that represent the viewing direction from a point in 3D space, and the zoom parameter of the camera, i.e., the field of view.

Figure 10:
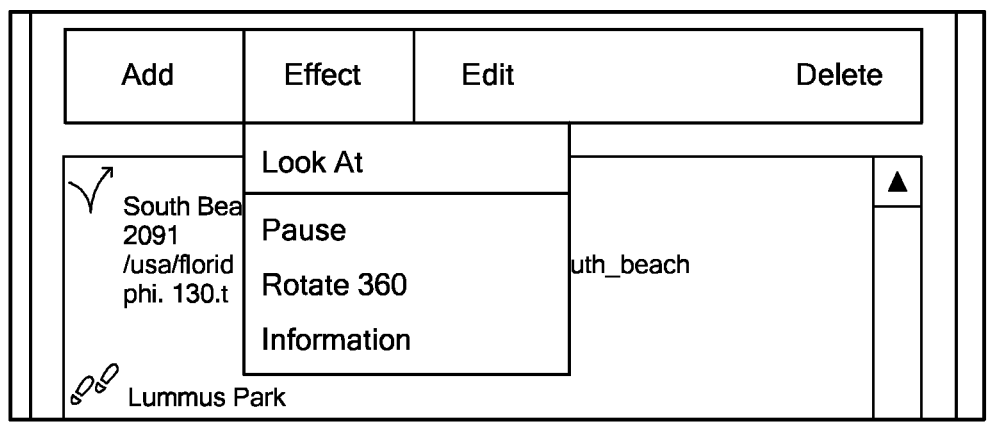
FIG. 10 shows defining a view direction at a location using the authoring tool.

Within the current panorama, the user can animate the sequence of the first-person viewer by adding keyframes. More specifically, the user first selects a panorama, and then under the "Effect" menu, selects the "Look At" feature (FIG. 10). This feature adds a specific view direction to the experience in the specific panorama in the specific sequence. The user can further add a "Pause" script, where the first-person viewer will pause for a specified duration in that view direction. Other viewing directives that can be added include (but are not limited to):

pause effects (for specific viewing directions within a specific panorama);

pause effects before transitions; and rotate the view in a location, controlling direction of rotation and/or the speed of rotation.

In-Context Annotation

Figure 11:
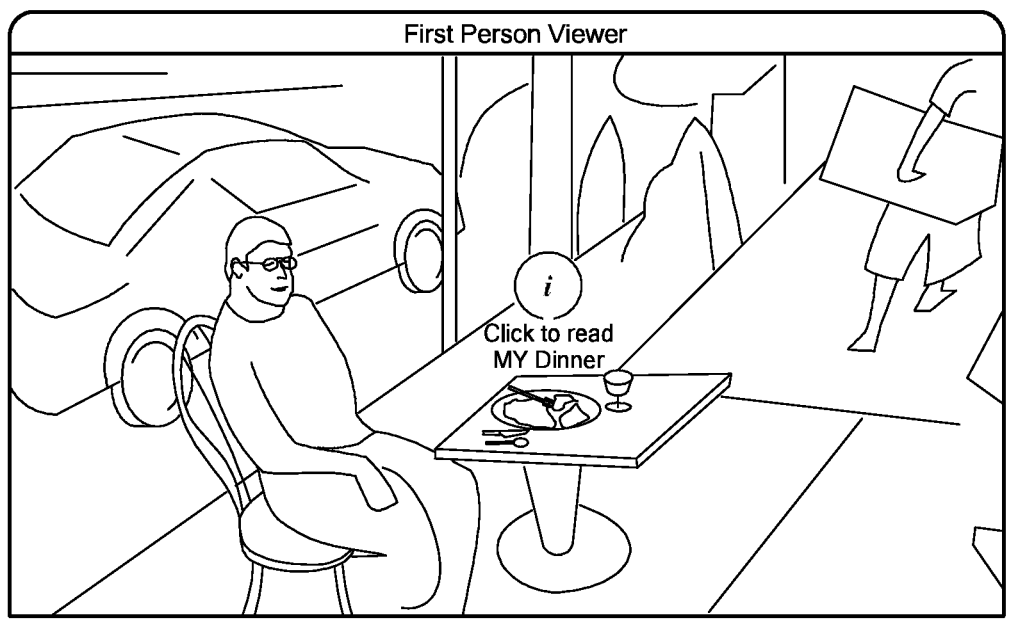
FIG. 11 illustrates adding an in-context annotation to the experience using the authoring tool, according to an embodiment of the invention.

The user can further enrich the experience by adding an in-context annotation. This enables the user to add specified text into the first-person viewer. As shown in FIG. 11, the user can choose to add a link via the menu and then fill out the indicated data. This information is then added to the experience script data and displayed as such during playback. Other features, such as audio, video, and photos may be added to the experience via a similar mechanism, as shown above.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, etc.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended claims. As will be apparent to those skilled in the art, techniques described above for panoramas may be applied to images that have been captured as non-panoramic images, and vice versa.

We claim:

1. A computer-implemented method of creating a motion picture experience of a realm based on a series of digitally stored images of the realm, the method comprising:
   a. receiving a user's definition of a series of locations in the realm, the series of locations comprising at least a first location and a second location that immediately succeeds the first location in the series of locations, wherein the first location is associated with a first location image and the second location is associated with a second location image;
   b. receiving a user's definition of a view direction for each location in the series of locations associated with a first person view;
   c. receiving a user's selection of at least one virtual image, each of the at least one virtual images representing a virtual camera view of the realm from a distinct point in a three-dimensional space between the first location and the second location, and each of the at least one virtual images comprising a portion of the first location image and a portion of the second location image projected in a 3D geometry with texture mapping; and
   d. storing, in a tangible non-transitory computer readable medium, for subsequent playback on a display, (i) data describing the series of locations and, for each of the locations, the view direction corresponding thereto; and (ii) the at least one virtual image, such that playback of the first location image, the at least one virtual image, and the second location image simulates motion in three-dimensional space from the first location to the second location.

2. A method according to claim 1, wherein storing further includes storing at least one of data describing text, an image, video, hyperlink, and audio associated with a specified location in the series of location.

3. A method according to claim 1, wherein, for at least one location in the series of locations, receiving a user's definition of a view direction includes receiving a definition with a plurality of view directions with an associated sequence for playback.

4. A method according to claim 1, further comprising:
   e. receiving a user's definition of transitional effect data that depends on the direction of motion between the pair of locations.

5. A method according to claim 1, further comprising:
   e. using a first person view of a specified location in the series of locations to define an object linked to the specified location, wherein storing data includes storing a pointer to the object.

6. A method according to claim 5, wherein the object linked to the specified location is at least one of an audio track, a video clip, an image, a text annotation, a hyperlink, and a navigational icon.

7. A method according to claim 1, further comprising:
   e. displaying the motion picture experience on a display using the stored data.

8. A method according to claim 1, further comprising:
   e. editing the stored data.

9. A method of providing a motion picture experience of a realm based on a series of digitally stored 2-D images of the realm, the method comprising:
   a. accessing digitally stored data, the data including 2-D images for a first location and a second location, wherein the first location is associated with a first location image and the second location is associated with a second location image in the realm, each of the first location image and the second location image having a corresponding view direction for a first-person viewer;
   b. accessing at least one virtual image, each of the at least one virtual images representing a virtual camera view of the realm from a distinct point in a three-dimensional space between the first location and the second location, and each of the at least one virtual images comprising a portion of the first location image and a portion of the second location image projected in a 3D geometry with texture mapping; and
   c. obtaining video from the data which when displayed provides the motion picture experience by sequentially displaying the first location image, the at least one virtual image, and the second location image, such that there is simulated motion between the pair of locations.

10. A method according to claim 9, wherein displaying includes displaying at least one of text, an image, video, and audio associated with a specified location in the series of locations.

11. A method according to claim 9, wherein displaying includes displaying a sequence of view directions for a first-person viewer for a specified location.

12. A method according to claim 9, wherein the data are accessed through a communications network.

13. A method according to claim 9, wherein the data are accessed from a non-transitory computer-readable medium.

14. A method according to claim 9, wherein displaying the motion picture experience includes randomly selecting locations from the series of locations for display.

15. A method according to claim 9, wherein the accessed data includes a sequence for the series of locations and displaying includes displaying locations with a discontinuity in the sequence.

16. A method according to claim 9, wherein displaying the experience includes:
   displaying a predetermined sequence of locations from the series of location;
   displaying a choice of additional locations to display;
   receiving an input identifying a further location; and
   displaying the experience for the further location.

* * * * *